US010735327B2

(12) United States Patent
Wu et al.

(10) Patent No.: US 10,735,327 B2
(45) Date of Patent: Aug. 4, 2020

(54) FAULT TOLERANT AND LOAD BALANCED ROUTING

(71) Applicant: Microsoft Technology Licensing, LLC, Redmond, WA (US)

(72) Inventors: Haitao Wu, Beijing (CN); Chuanxiong Guo, Jiangsu (CN); Yongguang Zhang, Beijing (CN); Lihua Yuan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 203 days.

(21) Appl. No.: 14/898,277

(22) PCT Filed: Jun. 14, 2013

(86) PCT No.: PCT/CN2013/077218
§ 371 (c)(1),
(2) Date: Dec. 14, 2015

(87) PCT Pub. No.: WO2014/198053
PCT Pub. Date: Dec. 18, 2014

(65) Prior Publication Data
US 2016/0149816 A1 May 26, 2016

(51) Int. Cl.
*H04L 12/803* (2013.01)
*H04L 12/703* (2013.01)
*H04L 12/709* (2013.01)

(52) U.S. Cl.
CPC .......... *H04L 47/125* (2013.01); *H04L 45/245* (2013.01); *H04L 45/28* (2013.01); *Y02D 50/30* (2018.01)

(58) Field of Classification Search
CPC .................................................... H04L 47/125
(Continued)

(56) References Cited

U.S. PATENT DOCUMENTS 7,480,256 B2    1/2009 Akyol et al.
7,859,993 B1 *  12/2010 Choudhury ......... H04L 41/0681
                                                        370/217
(Continued)

FOREIGN PATENT DOCUMENTS

CN    101227753       7/2008
CN    102710489       10/2012
CN    103026668 A     4/2013

OTHER PUBLICATIONS

The European Office Action dated Aug. 2, 2016 for European patent application No. 13886796.5, a counterpart foreign application of U.S. Appl. No. 14/898,277, 5 pages.
(Continued)

Primary Examiner — Kodzovi Acolatse
Assistant Examiner — Abdeltif Ajid
(74) Attorney, Agent, or Firm — Schwegman Lundberg & Woessner, P.A.

(57) ABSTRACT

Techniques are described for balancing traffic load for networks configured in multi-rooted tree topologies, in the presence of link failures. Maximum flows (through minimum cuts) are calculated for subgraphs that incorporate effective link capacities on links between source and destination nodes. Effective link capacities may be determined that take into account link failures, as well as sharing of current available link capacities by multiple nodes. Traffic is balanced while simultaneously fully utilizing available link capacities, even available link capacities on partially failed links (e.g., partially failed Link Aggregation Groups (LAGs)).

19 Claims, 9 Drawing Sheets

(58) Field of Classification Search
USPC .......................................................... 370/235
See application file for complete search history.

(56) References Cited

U.S. PATENT DOCUMENTS

| | | | | |
|---|---|---|---|---|
| 8,787,400 | B1* | 7/2014 | Barth | H04L 45/24 370/419 |
| 2006/0291390 | A1* | 12/2006 | Zhang | H04L 43/00 370/235 |
| 2007/0064613 | A1* | 3/2007 | Qian | H04L 45/12 370/238 |
| 2007/0121510 | A1 | 5/2007 | Chekuri et al. | |
| 2008/0279103 | A1* | 11/2008 | Yong | H04L 45/00 370/235 |
| 2010/0020806 | A1* | 1/2010 | Vahdat | H04L 45/00 370/395.31 |
| 2011/0029982 | A1* | 2/2011 | Zhang | H04L 47/125 718/105 |
| 2012/0287791 | A1 | 11/2012 | Xi et al. | |
| 2014/0362705 | A1* | 12/2014 | Pan | H04L 45/125 370/237 |
| 2015/0134830 | A1* | 5/2015 | Popa | H04L 49/00 709/226 |

OTHER PUBLICATIONS

The European Office Action dated Apr. 4, 2017 for European patent application No. 13886796.5, a counterpart foreign application of U.S. Appl. No. 14/898,277, 4 pages.

Clauset, "Maximum Flows and Minimum Cuts", retrieved on Apr. 15, 2016 at <<http://tuvalu.santafe.edu/~aaronc/courses/5454/csci5454_spring2013_L9-10.pdf>>, Feb. 20, 2013, pp. 1-8.

Curtis, et al., "REWIRE: An Optimization-based Framework for Unstructured Data Center Network Design", 2012 Proceedings IEEE INFOCOM, Mar. 25, 2012, IEEE, pp. 1116-1124.

The European Office Action dated May 13, 2016 for European Patent Application No. 13886796.5, a counterpart foreign application of U.S. Appl. No. 14/898,277, 5 pages.

The Supplementary European Search Report dated Apr. 26, 2016 for European Patent Application No. 13886796.5, 5 pages.

Gurusamy, et al., "An Integrated Resource Allocation Scheme for Multi-Tenant Data-center", 37th Annual IEEE Conference on Local Computer Networks, LCN 2012, Oct. 22, 2012, pp. 496-504.

Luss, et al., "Survivable Telecommunications Network Design Under Different Types of Failures", IEEE Transactions on Systems, Man, and Cybernetics—Part A: Systems and Humans, vol. 34, No. 4, Jul. 2004, pp. 521-529.

Al-Fares, et al., "A Scalable, Commodity Data Center Network Architecture", In Proceedings of the ACM SIGCOMM Conference on Data Communication, Aug. 17, 2009, 12 pages.

Al-Fares, et al., "Hedera: Dynamic Flow Scheduling for Data Center Networks", In Proceedings of the 7th USENIX Conference on Networked Systems Design and Implementation, Apr. 28, 2010, 15 pages.

Chen, et al., "Generic and Automatic Address Configuration for Data Center Networks", In Proceedings of the ACM SIGCOMM Conference, Aug. 30, 2010, 12 pages.

Dean, et al., "MapReduce: Simplified Data Processing on Large Clusters", In Proceedings of 6th Symposium on Operating Systems Design and Implementation, Dec. 6, 2004, 13 pages.

Decandia, et al., "Dynamo: Amazon's Highly Available Key-Value Store", In Proceedings of Twenty-first ACM SIGOPS Symposium on Operating Systems Principles, Oct. 14, 2007, 16 pages.

Ford, et al., "Maximal Flow through a Network", In Canadian Journal of Mathematics, vol. 8, Jan. 1, 1956, 6 pages.

Ghemawat, et al., "The Google File System", In Proceedings of the Nineteenth ACM Symposium on Operating Systems Principles, Oct. 19, 2003, 15 pages.

Greenberg, et al., "VL2: A Scalable and Flexible Data Center Network", In Proceedings of the ACM SIGCOMM Conference on Data Communication, Aug. 17, 2009, 12 pages.

Guo, et al., "BCube: A High Performance, Server-centric Network Architecture for Modular Data Centers", In Proceedings of the ACM SIGCOMM Conference on Data Communication, Aug. 17, 2009, 12 pages.

Guo, et al., "DCell: A Scalable and Fault Tolerant Network Structure for Data Centers", In Proceedings of the ACM SIGCOMM Conference on Data Communication, Aug. 17, 2008, 12 pages.

"High-Capacity StrataXGS Trident Ethernet Switch Series with Integrated 10G Serial PHY", Retrieved on: Apr. 23, 2013, Available at: http://www.broadcom.com/products/Switching/Carrier-and-Service-Provider/BCM56840-Series.

Isard, et al., "Dryad: Distributed Data-Parallel Programs from Sequential Building Blocks", In Proceedings of the 2nd ACM SIGOPS/EuroSys European Conference on Computer Systems, Mar. 21, 2007, 14 pages.

Katz, et al., "Bidirectional Forwarding Detection (BFD)", In Proceedings of in Internet Engineering Task Force (IETF) Request for Comments: 5880, Jun. 2010, 50 pages.

Katz, et al., "Bidirectional Forwarding Detection (BFD) for IPv4 and IPv6 (Single Hop)", In Internet Engineering Task Force (IETF) Request for Comments: 5881, Jun. 2010, 8 pages.

Li, et al., "OpenFlow based Load Balancing for Fat-Tree Networks with Multipath Support", Retrieved on: Apr. 22, 2013, Available at: http://users.cis.flu.edu/~pand/publications/13icc-yu.pdf.

Mahapatra, et al., "Load Balancing Mechanisms in Data Center Networks", In Proceeding of the 7th International Conference & Expo on Emerging Technologies for a Smarter World, Sep. 2010, 6 pages.

Moy, J., "OSPF Version 2", In Network Working Group, Request for Comments: 2328, Apr. 1998, 191 pages.

Mysore, et al., "PortLand: A Scalable Fault-Tolerant Layer 2 Data Center Network Fabric", In Proceedings of the ACM SIGCOMM Conference on Data Communication, Aug. 17, 2009, 12 pages.

PCT Search Report and Written Opinion dated Mar. 3, 2014 for PCT Application No. PCT/CN2013/077218, 9 Pages.

Raiciu, et al., "Improving Datacenter Performance and Robustness with Multipath TCP", In Proceedings of the ACM SIGCOMM Conference, Aug. 15, 2011, 12 pages.

Thaler, et al., "Multipath Issues in Unicast and Multicast Next-Hop Selection", In Network Working Group, Request for Comments: 2991, Nov. 2000, 10 pages.

Wang, et al., "MCube: A High Performance and Fault-tolerant Network Architecture for Data Centers", In Proceedings of the International Conference on Computer Design and Applications, Jun. 25, 2010, 5 pages.

Wischik, et al., "Design, Implementation and Evaluation of Congestion Control for Multipath TCP", In Proceedings of 8th USENIX Conference on Networked Systems Design and Implementation, Mar. 30, 2011, 14 pages.

Wu, et al., "DARD: Distributed Adaptive Routing for Datacenter Networks", In Proceedings of IEEE 32nd International Conference on Distributed Computing Systems, Jun. 18, 2012, 13 pages.

Wu, et al., "NetPilot: Automating Datacenter Network Failure Mitigation", In Conference of ACM SIGCOMM Conference, Aug. 13, 2012, 12 pages.

Xi, et al., "Enabling Flow-based Routing Control in Data Center Networks using Probe and ECMP", In Proceeding of the IEEE Conference on Computer Communications Workshops, Apr. 10, 2011, 6 pages.

Zhang-Shen, et al., "Designing a Fault-Tolerant Network Using Valiant Load-Balancing", In Proceeding of the IEEE 27th Conference on Computer Communications, Apr. 13, 2008, 5 pages.

"First Office Action and Search Report Issued in Chinese Patent No. 201380077450.4", dated Apr. 4, 2018, 14 Pages.

* cited by examiner

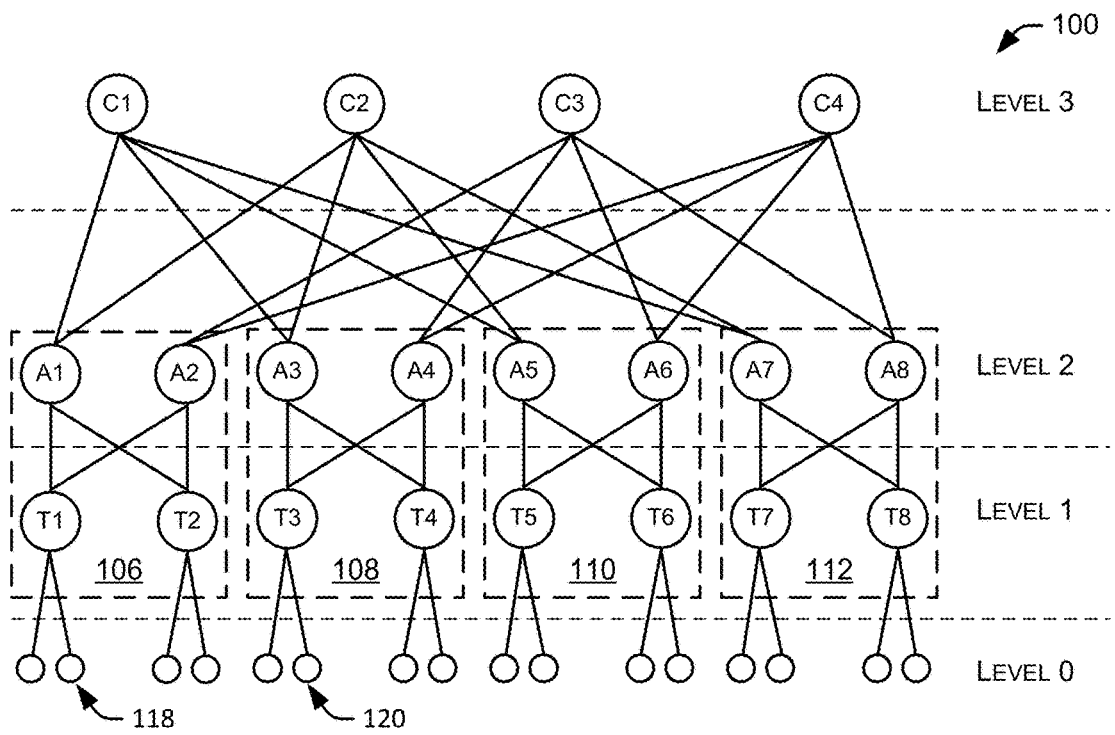
FAT-TREE TOPOLOGY 102
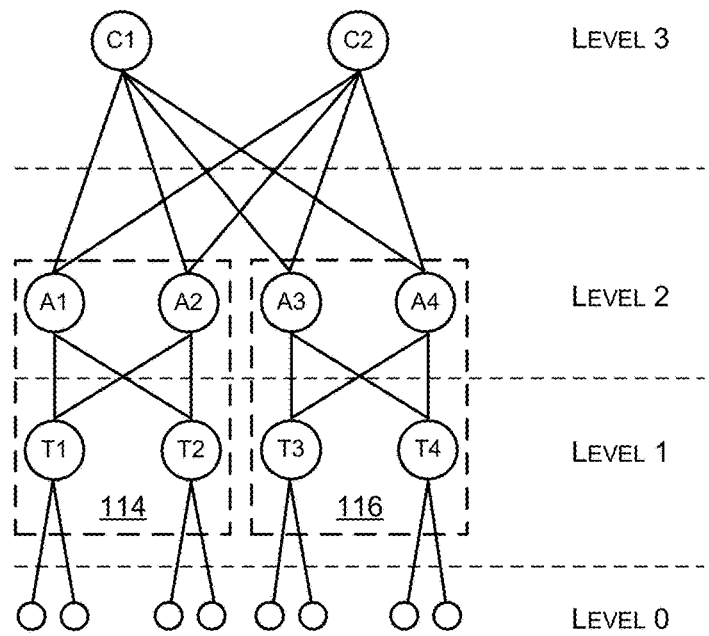
VIRTUAL LAYER TWO (VL2) TOPOLOGY 104
FIG. 1

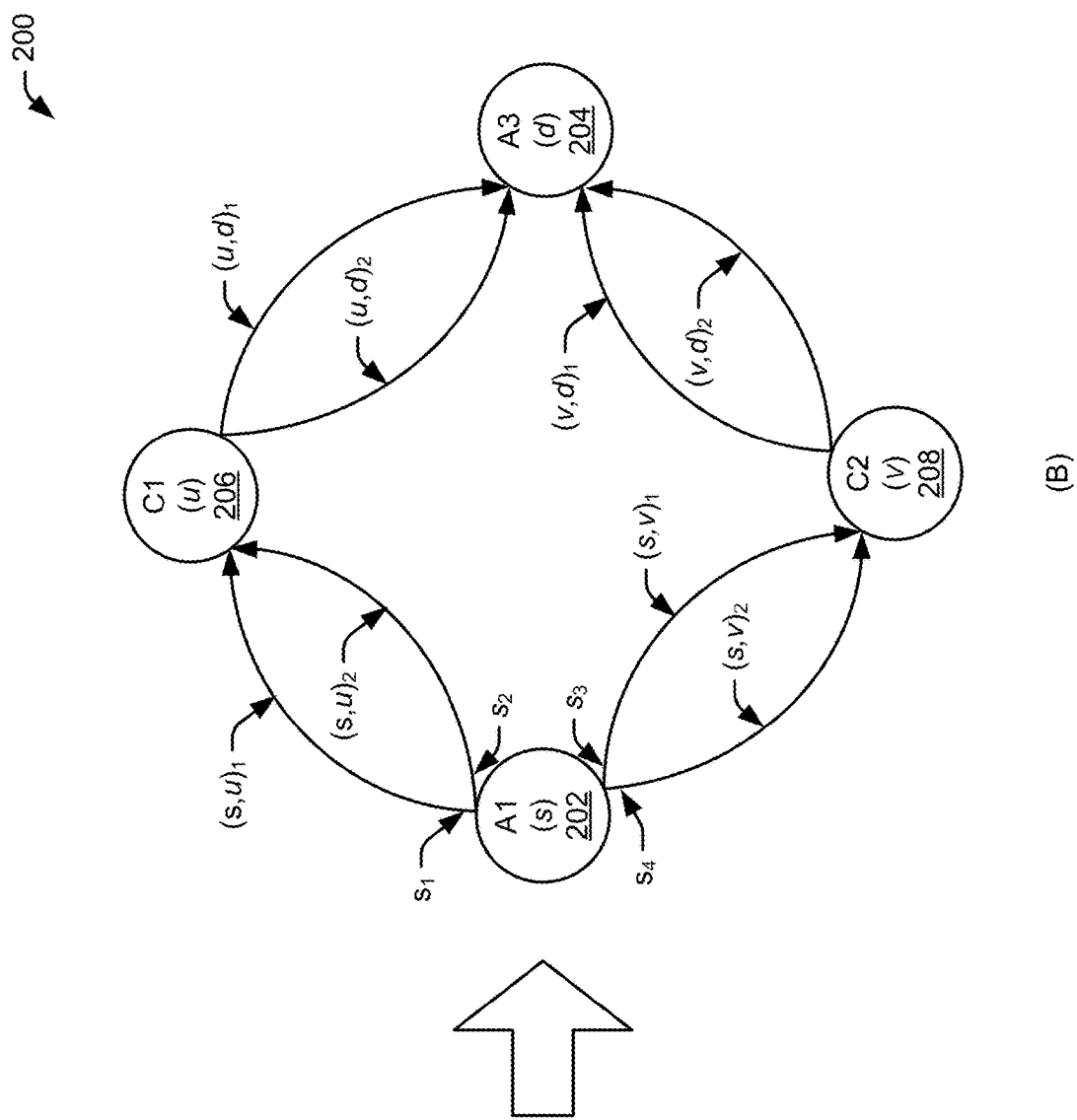
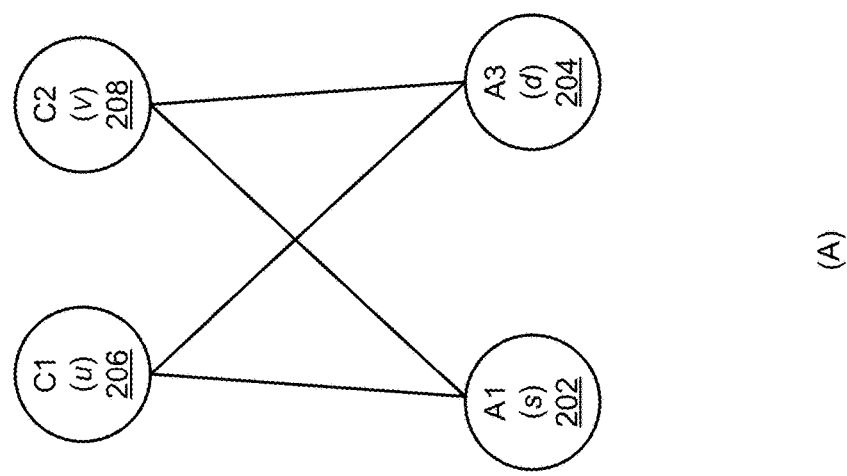
FIG. 2

← 600

Initialization:
1. $t_i$ is the $i$-th input link capacity; $i = 1...N$;
2. $c_j$ is the $j$-th output link capacity; $j = 1...M$;
3. $C = \sum_{j=1}^{M} c_j$; $e_i = 0$ ($i = 1...N$);
4. $flag$=true; $num$=$N$; $used$=0;

*EffectiveLinkCapacity(Ax,i)*

5. While($flag$)
6.    $\delta = (C - used)/num$; /*try equal division*/
7.    $flag$=false;
8.    For($k = 1; k \leq N; k++$)
9.      If($e_k < t_k$) /*$T_k$'s output is not saturated*/
10.        $used = used + \min(t_k - e_k, \delta)$;
11.        $e_k = e_k + \min(t_k - e_k, \delta)$;
12.        IF($e_k == t_k$) $num = num - 1$;
13.        ELSE $flag$=true;
14.    If($C == used$) $flag$=false; /*no capacity left*/
15. IF($C \neq used$)
16.    For($k = 1; k \leq N; k++$) $e_k = e_k + e_k(C - used)/used$;
17. For($j = 1; j \leq M; j++$) $e_j^i = c_j * e_i / C$;

FIG. 6

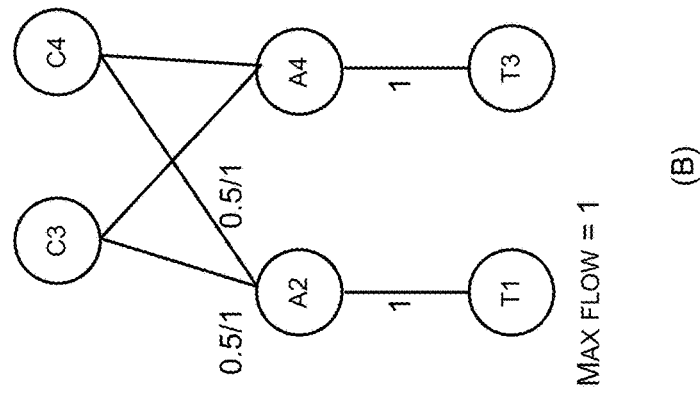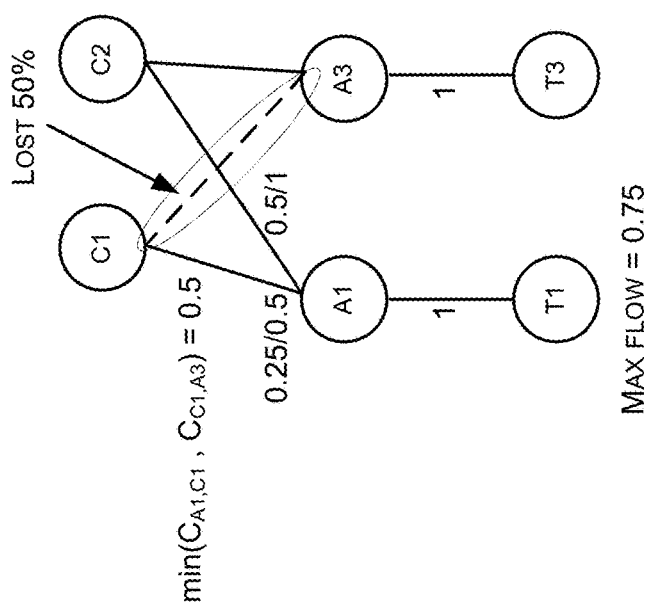
FIG. 7

FAULT TOLERANT AND LOAD BALANCED ROUTING

BACKGROUND

Multi-rooted tree structures are commonly deployed in production Data Center Networks (DCNs) to provide high bisection bandwidth. Load balancing strategies, such as Equal-Cost Multi-Path routing (ECMP), are commonly used to balance data traffic load on multiple parallel paths between nodes (e.g., commodity network switches, routers) in the DCN. However, when link failures occur, the highly symmetric DCNs become asymmetric. The asymmetry challenges the load balancing of existing traffic oblivious routing protocols, as existing routing protocols are designed to address destination reachability by least-cost paths. Thus, existing load balancing strategies cannot simultaneously balance traffic and fully utilize link capacities. As a result, network congestion occurs, reducing data throughput in the DCN.

DCNs commonly use logical links between nodes. The logical link is commonly referred to as a Link Aggregation Group (LAG), which generally consists of multiple physical links. The use of LAGs makes the load-balancing problem even more complicated, as a physical link failure in a LAG leads to partial capacity loss in a logical link. Existing routing protocols (e.g, Open Shortest Path First (OSPF)) are generally not aware of such changes to the logical link capacity, and thus continue to route the same amount of load to the degraded LAG, which causes persistent congestion.

To handle this problem with existing routing protocols, the whole LAG, including the healthy physical links of the partially failed LAG, is often disabled. Additional links may be disabled, for example, to assist the routing protocol to find a different path to temporarily mitigate the congestion caused by the unbalanced load. However, the sacrificed link capacity often leads to congestion on a larger scale, especially when overall link capacity in the network is highly utilized. For example, OSPF improperly balances the load facing link failures on asymmetric and non link-disjoint paths, even if information of physical link failure in a LAG is available.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

FIGS. 1(A) and 1(B) illustrate example network topologies of a network.

FIGS. 2(A) and 2(B) illustrate partial link failures in an example network.

FIG. 6 illustrates an example of pseudo code for determining effective link capacities at a node.

FIGS. 7(A) and 7(B) illustrate maximum flows on paths between nodes in the presence of link failure.

DETAILED DESCRIPTION

Overview

Figure 3:
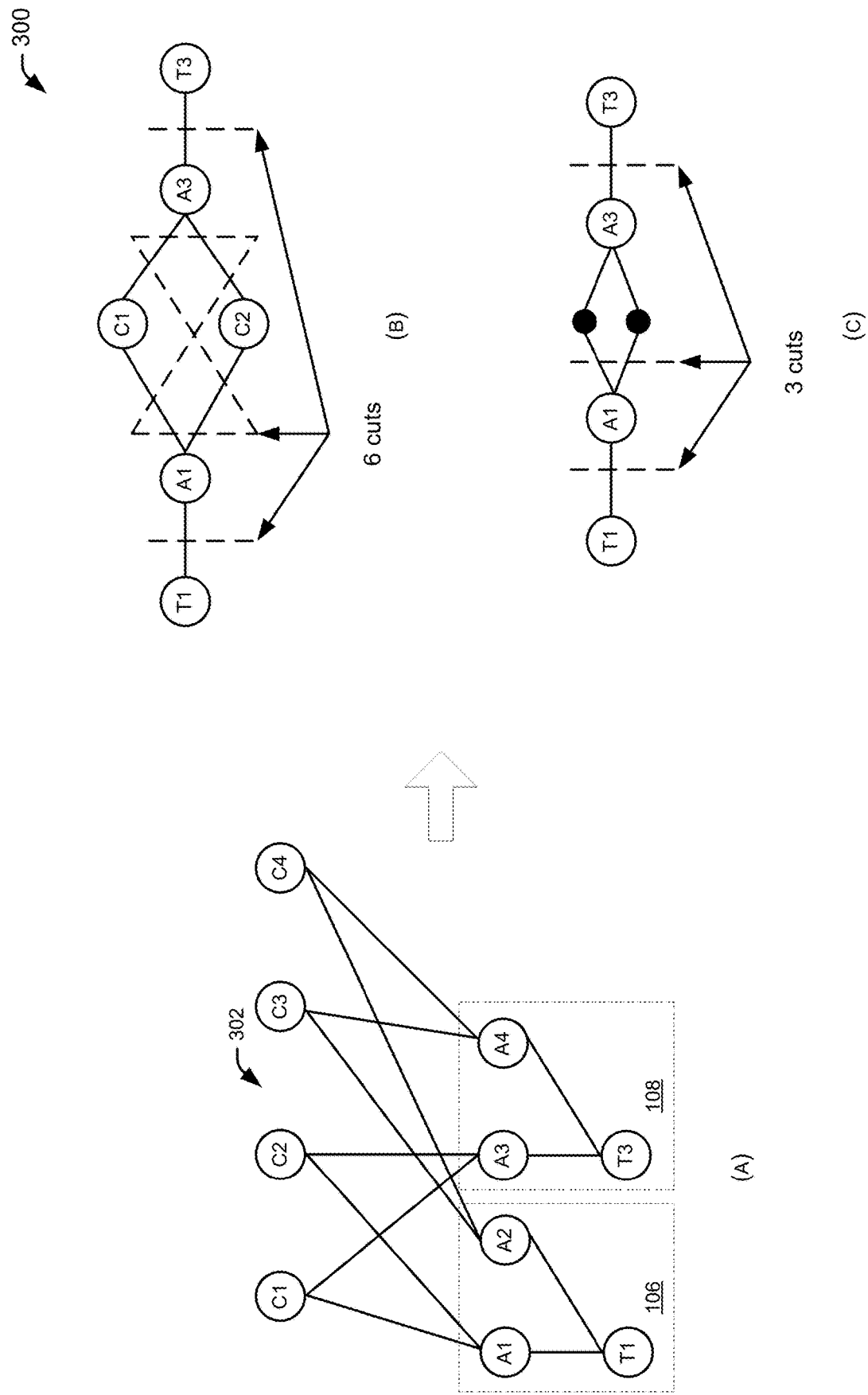
FIGS. 3(A)-3(C) illustrate subgraphs and converted subgraphs of an example network.

In Data Center Networks (DCNs), where nodes (e.g., commodity switches, routers) and links are commonly configured as multi-rooted tree topologies, traditional routing protocols like Open Shortest Path First (OSPF) with Equal-Cost Multi-Path routing (ECMP) essentially use a number of paths to a destination to determine a number of ECMP entries to achieve traffic load balancing. Thus, traditional routing protocols and load-balancing strategies often improperly balance traffic to the destination when link failures occur. A miscount of non link-disjoint paths and the disregard for link contentions among nodes at various levels in a DCN topology are examples of fundamental problems for traditional traffic oblivious load balance routing.

This disclosure describes techniques for balancing traffic load for networks configured as multi-rooted tree topologies, in the presence of link failures, based on calculating maximum flows (through minimum cuts) for subgraphs that incorporate effective link capacities on links between source/destination node pairs. Effective link capacities are determined that take into account link failures, as well as sharing of current available link capacities (i.e., link contentions) by multiple nodes. Thus, the load-balancing techniques described herein simultaneously balance traffic and fully utilize available link capacities, including available link capacities on partially failed links (e.g., partially failed Link Aggregation Groups (LAGs)).

To reduce computational complexity of maximum flow calculations, the subgraphs can include converted subgraphs determined based on removing common parts from subgraphs. Subgraphs can also include a reduced subgraph set, determined based on differentiating healthy pods from unhealthy pods in the network. In various embodiments, determined maximum flows are used as weights to balance loads (e.g., split traffic) on corresponding node interfaces.

This disclosure further describes load-balancing techniques that at least are suitable for use with link-state routing type protocols, such as in a centralized configuration, as well as distance-vector or path-vector based routing protocols used in a distributed configuration among nodes in networks.

The discussion herein includes several sections. Each section is intended to provide examples of techniques and/or structures, but is not intended to indicate elements which must be used and/or performed. A section entitled "Example Environment" discusses aspects of multi-rooted tree network topologies. A section entitled "Example Subgraphs" discusses aspects of using subgraphs to determine maximum flows in source/destination node pairs. A section entitled "Effective Link Capacity" discusses techniques for determining link capacities that account for sharing of links between nodes in the presence of link failures. A section entitled "Complexity Reduction" discusses techniques for reducing computational complexity of maximum flow calculations. A section entitled "Example Implementations"

discusses techniques for centralized and distributed load-balancing implementations, followed by a section entitled "Example Load-Balancing Systems" that discusses load-balancing implementations from a systems perspective. A section entitled "Example Methods of Operation" discusses examples of load-balancing methods. A brief "Conclusion" follows these sections. This brief introduction is provided for the reader's convenience and is not intended to describe and/or limit the scope of the claims or any section of this disclosure.

Example Environment

FIG. 1 illustrates an example environment 100 of multi-rooted tree topologies of nodes and links that can be used in a Data Center Network (DCN) environment. Fat-tree topology 102 illustrates a portion of an example DCN configured as a fat-tree topology of nodes, links and computing devices. Meanwhile, Virtual Layer Two (VL2) topology 104 illustrates an example DCN configured in a VL2 topology of nodes, links and computing devices.

In Fat-tree topology 102, level 3 includes nodes C1-C4 connected to level 2 nodes A1-A8 via communication links as shown. Level 1 includes nodes T1-T8 connected to level 2 nodes A1-A8, via communication links as shown. Level 0 includes various computing devices, such as servers, connected to associated nodes T1-T8. Fat-tree topology 102 illustrates various nodes and computing devices grouped into various pods 106, 108, 110 and 112. For example, pod 106 includes nodes A1, A2, T1 and T2. For illustrative purposes, only four pods 106, 108, 110 and 112 are shown, and only four level 0 computing devices are shown connected to each pod. However, production DCNs may interconnect tens of thousands of servers, and use many more pods, nodes and links to provide high bisection bandwidth to support diverse data center applications. As an example, nodes T1-T8 may include commodity (e.g., generally available, commercial off-the shelf, not necessarily custom or specialized) relatively small, relatively low-cost, and/or relatively low port count switches (e.g., Top-of-Rack (ToR) switches). As an example, such switches may connect several to tens of computing devices at, for example, 1 Gbps per connection. Nodes A1-A8 may include commodity Aggregate (Agg) switches (e.g., point to multi-point switches, switches that aggregate data from lower speed connections onto higher speed connections, etc.). As an example, such switches may aggregate 1 Gbps connections to 10 Gbps connections. Nodes C1-C4 may include commodity Core switches (e.g., tandem switches, backbone switches, high capacity switches positioned in a physical core, or backbone of a network), or different combinations thereof. As another example, nodes T1-T8, A1-A8 and C1-C4 may include combinations of any type of commodity network switches that can aggregate data transport between level 0 devices in different pods 106, 108, 110 and 112 utilizing redundant paths as illustrated in topologies 102 and 104. For purposes of discussion herein, and without any implied limitation, nodes T1-T8 will be referred to as ToR switches, nodes A1-A8 will be referred to as Agg switches and nodes C1-C4 will be referred to as Core switches.

VL2 topology 104 includes level 3 nodes C1-C2, level 2 nodes A1-A4 and level 1 nodes T1-T4. Nodes are shown in corresponding pods 114 and 116, along with associated level 0 computing devices. VL2 topology 104 illustrates a higher degree of connectivity between level 2 and level 3 nodes, as compared to Fat-tree topology 102.

As an example, in Fat-tree topology 102, a connection may be established between a server 118 connected to node T1 in pod 106 to a server 120 connected to node T3 in pod 108. Multiple parallel paths are provided by multi-rooted tree topologies. With links between nodes denoted by "(node1, node2)", shortest paths through nodes between servers 118 and 120 can include:
  (T1, A1), (A1, C1), (C1, A3) and (A3, T3)
  (T1, A1), (A1, C2), (C2, A3) and (A3, T3)
  (T1, A2), (A2, C3), (C3, A4) and (A4, T3)
  (T1, A2), (A2, C4), (C4, A4) and (A4, T3)

As an example, from a perspective of node A1, assuming that each link has the same capacity, node T1 appears to have an upstream capacity to node T3 that consists of the total capacity of the two paths:
  (T1, A1), (A1, C1), (C1, A3) and (A3, T3)
  (T1, A1), (A1, C2), (C2, A3) and (A3, T3)

However, node A1 shares its upstream capacity with both nodes T1 and T2. Thus, node T1 has an effective capacity of half of the total capacity of upstream paths from the perspective of node A1. Additionally, if one or more links in the two paths shown above were to have a lower capacity (e.g., a partial link failure), then the capacity of a corresponding path is dictated by a link with the lowest capacity. Therefore, optimal load-balancing needs to take into consideration the sharing of upstream capacity between source/destination node pairs, as well as capacity reductions attributed to link failures. Thus, assuming the link capacities in the two paths shown above are equal and normalized to 1, the current (e.g., collected) capacity of each path in the absence of link failures is 1. However, due to sharing, the effective link capacity of each path is 0.5.

Multi-rooted tree structures, such as those illustrated in FIG. 1, exhibit a high degree of symmetry and provide high bisection bandwidth. However, when link failures occur, the highly symmetric networks generally become asymmetric. The asymmetry challenges the load-balancing accuracy of existing traffic oblivious routing protocols. Thus, existing load-balancing strategies cannot simultaneously balance traffic and fully utilize link capacities, which often results in network congestion.

DCNs commonly use logical links between nodes, such as links between level 1, 2 and 3 nodes shown in FIG. 1. The resulting logical link may be referred to as a LAG, which consists of multiple physical links. As an example, the link between node A1 and node C1 in Fat-tree topology 102 may consist of a virtual 20 Gbps link that consists of two physical 10 Gbps links between corresponding ports or interfaces. Thus, if a physical link in this LAG fails, the LAG loses 50% of its capacity. However, nodes A1 and C1 are still reachable through the remaining healthy physical link in the LAG.

Existing routing protocols (e.g, Open Shortest Path First (OSPF)), do not consider changes to the actual link capacity, as well as changes in total upstream capacity, and thus generally continue to route a same amount of load to the degraded LAG, causing congestion. Existing routing protocols will often disable the whole partially degraded LAG, including the healthy physical links of the LAG. Often, surrounding links are disabled also. Disabling links can temporarily mitigate the congestion caused by an unbalanced load. However, the sacrificed total link capacity often leads to congestion on a larger scale in the network.

Regarding FIG. 1, Fat-tree topology 102 is generally considered a switch-centric structure. Compared with tree structures where each layer has over-subscription, a fat-tree structure generally maintains a 1:1 subscription ratio at each level. In contrast to fat-tree topologies, in which Gigabit Ethernet links are commonly used, VL2 (e.g., VL2 topology 104) leverages a hierarchical Ethernet link capacity. As an example, ToR switches (e.g., nodes T1-T4) connect to servers at level 0 with Gigabit Ethernet links while connecting to Agg switches (e.g., A1-A4) at level 2 with 10 Gigabit Ethernet links. In fat-tree and VL2 topologies, each pod (e.g., of pods 106-116) is viewed as a sub-topology in which ToR and Agg switches may be interconnected as a bi-parted graph. In general, each Core switch has at least one link to each pod in the network.

Both fat-tree and VL2 topologies, as illustrated in FIG. 1, can use commodity switches to scale out the infrastructure that connects tens of thousands of servers. For any given source and destination node pair, there are multiple paths to choose from. Even if only the shortest-path with the least number of hops is counted, the number of paths is still very large. For example, for a fat-tree topology, there are $(k/2)^2$ shortest paths between any two servers in different pods, where k denotes the radix (i.e., number of ports) of a switch. If 48-port Gigabit Ethernet switches are used to build the fat-tree, the number of shortest-paths is 576, which often overwhelms the 16-way ECMP entries on commodity switches that commonly existed at the time when fat-tree was designed.

When the packets of a TCP connection (e.g., a flow) arrive at the network from a server, a consistent path should be selected from all the available shortest-paths to avoid a packet out-of-order problem. To balance the load without affecting the ordered TCP packet flow, fat-tree sometimes uses the destination IP addresses suffix as an index to select an upstream path (e.g., node port(s)) through the network. Although this approach uses a small routing table, the load balance granularity at the server scale is very coarse.

VL2 topologies commonly use both Valiant Load Balance (VLB) and ECMP to balance the traffic at the TCP flow scale. To work around the small number of ECMP entries and potentially large number of Core switches, VL2 topologies generally use multiple anycast IP addresses. As an example, each IP address is associated with as many Core switches as ECMP can accommodate.

For purposes of discussion of enhanced load-balancing techniques and strategies as described herein, the interconnection between the nodes is focused on, while the connection to servers are ignored. The terms "node", "switch" and "router" may be used interchangeably in this disclosure. However, in various embodiments, the techniques described herein also apply when the source and destination nodes are servers.

FIG. 2 shows an example environment 200 to illustrate an interconnection subgraph between portions of pods, for example, such as pods 106 and 108 of fat-tree topology 102. FIG. 2(A) illustrates connectivity between source node 202 (e.g., node A1 in pod 106 in FIG. 1) to destination node 204 (e.g., node A3 in pod 108 in FIG. 1) by way of nodes 206 (i.e., C1) and 208 (i.e., C2). With links between nodes denoted by "(node1, node2)", paths between source node A1 to destination node A3 node may include:

(A1, C1) and (C1, A3)
(A1, C2) and (C2, A3)

FIG. 2(B) illustrates that the links between nodes A1 and A3, shown in FIG. 2(A), can be implemented as logical links (e.g., LAGs) with, as an example, two physical links per logical link. Thus, node 202 is shown as having four interfaces, denoted by $S_1$, $S_2$, $S_3$ and $S_4$, to physical links $(s,u)_1$, $(s,u)_2$, $(s,v)_1$ and $(s,v)_2$, respectively. Moreover, the logical link between node 206 and node 204 includes physical links $(u,d)_1$ and $(u,d)_2$, and the logical link between node 208 and node 204 includes physical links $(v,d)_1$ and $(v,d)_2$.

In contrast to the techniques described herein, existing routing/load balancing protocols often do not properly respond to partial link failures in LAGs. As an example, if physical link $(s,u)_1$ failed between node 202 (A1) and node 206 (C1), the LAG would lose 50% of its capacity. However, as nodes A1 and C1 are still reachable through the healthy physical link $(s,u)_2$, the routing protocol will not respond properly. For example, link-state routing protocols generally use the number of hop-counts (e.g., number of nodes traversed) as the cost to select a least cost path. As the lost link capacity does not affect the hop-count between nodes, the traffic is routed as if the link had not partially failed. Thus, congestion occurs on the link between nodes A1 and C1, as the link's utilization, in this example, is twice that of other healthy links at the same level. In contrast, a proper load balancing algorithm would utilize the remaining link capacity in a partially failed link.

As an example, OSPF with ECMP uses link cost instead of hop-count and uses the Dijkstra algorithm to calculate the shortest path (with the least cost) between nodes. A straightforward reaction to handle a partial link failure is to enlarge the link cost between nodes A1 and C1 to represent the degradation of link capacity. However, the enlarged link cost means that the paths traversing this LAG are not shortest-path anymore, which causes ECMP to not use the healthy physical link (i.e., $(s,u)_2$). Thus, existing link capacity is wasted. In general practice, the whole LAG between A1 and C1 is disabled to ensure existing routing protocols respond correctly to load balancing, as a disabled link indicates infinite link cost. Depending on the network topologies, more related links may also be disabled, such as to cause the routing protocol to select a different healthy path, which leads to congestion "hot spots" in other locations of the network. In contrast, a proper load balancing algorithm would utilize existing and remaining link capacity instead of further reducing available link capacity.

The partial link failure challenges existing routing protocols and ECMP for load balancing. On the one hand, if the routing does not respond, the partially failed link experiences congestion and therefore affects the throughput of flows traversing on it. On the other hand, although disabling the whole LAG and related links mitigates the load balancing problem, this approach sacrifices the total link capacity and thus potentially leads to congestion in the network on a larger scope.

FIG. 2(B) is used to illustrate examples of using OSPF with ECMP, under various physical link failure conditions. For no physical link failures, for node 206, source node 202 finds there are two links from node 202 to node 206, using interface $S_1$ and $S_2$ of node 202, respectively. So node 202 uses ECMP entries $S_1$ and $S_2$ to node 206. Similar procedures occur for node 208 using ECMP entries $S_3$ and $S_4$. For destination node 204, the first shortest path is on link $(u,d)_1$ with the previous node 206. So ECMP entries to node 206 may be added to ECMP entries to node 204, (i.e., $S_1$ and $S_2$ are added as ECMP entries). Similarly, for the second shortest path traversing link $(u,d)_2$, $S_1$ and $S_2$ are added to ECMP entries to node 204 again. The procedure continues until $S_3$ and $S_4$ are added twice for node 208. Finally, node 202 has added 8 ECMP entries to destination node 204:

$S_1$, $S_1$, $S_2$, $S_2$, $S_3$, $S_3$, $S_4$, and $S_4$.

Thus, the ratio of traffic on the four interfaces $S_1$, $S_2$, $S_3$ and $S_4$ is 2:2:2:2. Thus, the number of ECMP entries for each interface may act as weights that correspond to a ratio used to balance traffic across the multiple interfaces.

However, as an example of a limitation of existing load balancing strategies, if both links $(s,u)_1$ and $(u,d)_1$ were to fail, representing partial link failures between nodes 202 and 206, and nodes 206 and 204, respectively, OSPF returns the ratio on the four interfaces as 0:1:2:2 (i.e., $S_2$, $S_3$, $S_4$, $S_3$ and $S_4$). In contrast, using a proper load balancing algorithm, the optimal ratio would be 0:1:1:1, because the maximum flow from the four interfaces of node 202 to the destination node 204 has this ratio.

Thus, using FIG. 2 as an example, it is shown that OSPF with ECMP is often unable to differentiate the link-disjoint paths from non link-disjoint paths, as the ECMP entries for a path are determined by the ECMP entries of the penultimate node in the path. Therefore, OSPF with ECMP essentially collects the number of paths traversing each interface, and transforms them into ECMP entries for load balancing.

Although the example above is for OSPF, an unbalanced load using ECMP occurs for other routing protocols and in more general topologies and failure cases. To this end, existing routing protocols with ECMP often do not respond correctly facing link failures, even without partial link failures.

Fault tolerant and load balanced routing, as described herein, addresses a number of the above-enumerated issues to properly perform load balancing when link failures occur in data center networks. First, link failure information, including partial link failure information, is collected and processed by, for example, nodes or other collection systems, so that the remaining link capacities are considered for a proper load balancing algorithm. This also means that if the failed links go back online, the information is updated.

Next, a proper load balancing algorithm calculates weights to split the traffic into multiple interfaces for load balancing. For traffic oblivious routing, which is generally used in data center networks, weights are determined to each destination on intermediate nodes. Generally, the network topology and the updated link capacities are known, while the traffic matrix is unknown (i.e., traffic oblivious). For a given sending node, including intermediate node(s), there are generally multiple selected paths to a receiving node. With the selected paths known (e.g., shortest paths determined by the routing algorithm), in various embodiments, the sender node is configured to decide or control how to split the traffic on its network interfaces. Thus, in such embodiments, nodes in a DCN are configured to enforce updated traffic splitting ratios.

As an example, traffic splitting ratios calculated by an enhanced load balancing algorithm, as described herein, are determined by, or provided to, the nodes. To overcome problems with existing routing and load balancing algorithms in the presence of link failures, in a proper load balancing algorithm, load balancing is performed by splitting traffic according to maximum flows between a source node and a destination node. In various embodiments, the multiple paths between the source node and the destination node are represented by subgraphs, where maximum flows are obtained by calculating minimum cuts on the subgraphs. Real link capacities of links are collected for the subgraphs. However, the collected real link capacities are not directly used for minimum cut calculation. This is because the links in a capacity graph (i.e., a graph of link capacities of links in the DCN), especially the links connecting high level nodes in multi-rooted tree topologies, are shared by multiple low level nodes. Thus, the real link capacities do not reflect link sharing by multiple nodes.

Example Subgraphs

FIG. 3 shows an example environment 300 to illustrate the calculation of minimum cuts to obtain maximum flows in subgraphs according to fault tolerant and load balanced routing as described herein. FIG. 3(A) illustrates a partial graph 302 consistent with a partial graph of topology 102 in FIG. 1, where node T1 in pod 106 is considered a source node, and node T3 in pod 108 is considered a destination node. Multiple shortest paths exist between source node T1 and destination node T3. In various embodiments, a capacity graph is used that includes link capacities of links between nodes in the DCN, to determine link capacities of the links shown in FIG. 3(A). A fully failed link is represented by the removal of the failed link in the capacity graph, while a partially failed link is represented in the capacity graph by its degraded link capacity. However, to achieve more optimal load balancing, a better solution determines minimum cuts in subgraphs by using effective link capacities, as described more fully herein, at least with regard to discussions of FIG. 4, FIG. 5 and FIG. 7. Effective link capacities take into account link capacity utilization (e.g., sharing) by other nodes in the multi-rooted tree topology.

FIG. 3(B) represents a subgraph of paths between source node T1 and destination node T3 traversing node A1 from partial graph 302. There are six cuts in total shown for this sub-graph, which are used to calculate the minimum cut to obtain the maximum flow for this sub-graph. The symbol $C_{A,B}$ is used to denote the link capacity of a link between node A and B. Thus, the minimum cut (MC) of the subgraph in FIG. 3(B) is represented in equation 1 as:

$$MC=\min(C_{T1,A1}, C_{A1,C1}+C_{A1,C2}, C_{A1,C1}+C_{C2,A3}, \\ C_{C1,A3}+C_{A1,C2}, C_{C1,A3}+C_{C2,A3}, C_{A3,T3}) \quad (1)$$

The straightforward calculation of minimum cut in equation 1 does not scale well with the number of core nodes (e.g., level 3 nodes) increasing, as the number of cuts increases quickly. As an example, to reduce the complexity of the minimum cut calculation, concatenated links are converted into a link set, with the minimum capacity of the links calculated as the link capacity of the link set. For example, the link capacity from switch A1 to A3 traversing C1 is calculated as the $\min(C_{A1,C1}, C_{C1,A3})$. Therefore, the MC of the subgraph in FIG. 3(C) (e.g., the minimum of the 3 cuts) from partial graph 302 is represented in simplified equation 2 as:

$$MC=\min(\min(C_{A1,C1}, C_{C1,A3})+\min(C_{A1,C2}, C_{C2,A3}), \\ C_{T1,A1}, C_{A3,T3}) \quad (2)$$

As an example, with such a conversion as shown in equation 2, the complexity of calculating minimum cuts increases linearly with the number of Core switches (e.g., nodes C1-C4) in fat-tree networks.

Effective Link Capacity

As discussed above, calculating minimum cuts on subgraphs having links represented by real current link capacities does not take into account link capacity sharing by other nodes in a network. After the sharing of link capacity is considered, the link capacity that qualifies for minimum cut calculation in a subgraph may be defined as the effective link capacity for the sending node in a subgraph.

Figure 4:
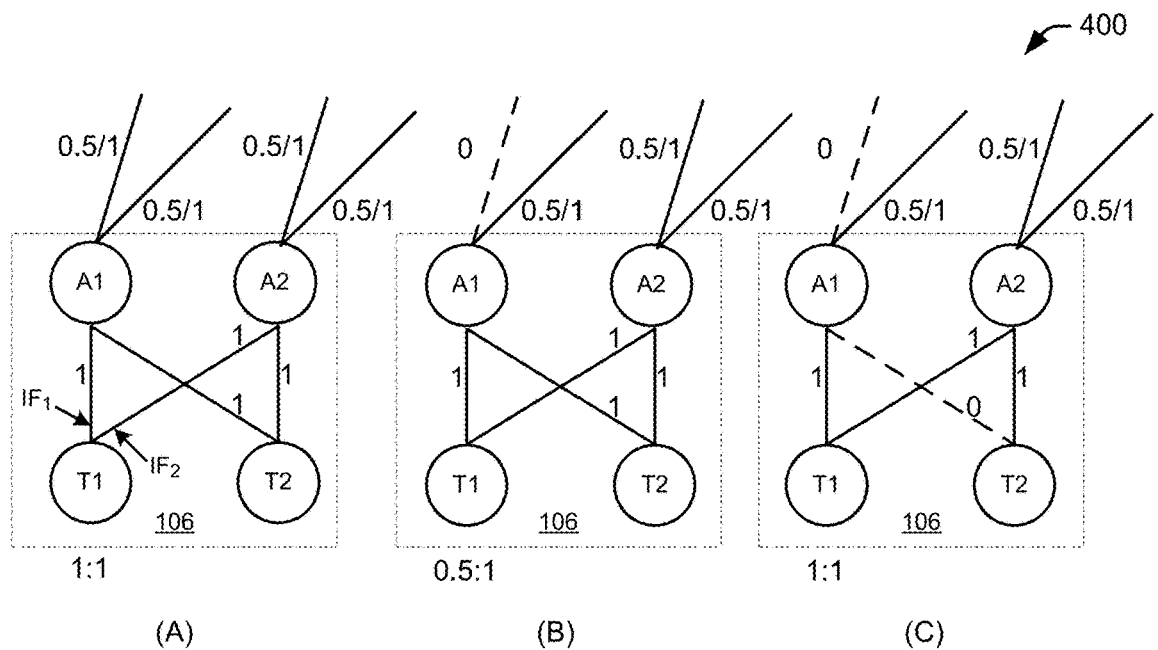
FIGS. 4(A)-4(C) illustrate effective link capacities in an example network.

FIG. 4 shows an example environment 400 to illustrate effective link capacities in a subgraph, and how effective link capacities are changed by link failures. FIGS. 4(A), 4(B) and 4(C) illustrate upstream links for nodes in pod 106 in FIG. 1 with and without link failures. Two upstream links are shown at node A1 to core nodes C1 and C2 (not shown). The two upstream links, however, are shared by nodes T1 and T2.

Therefore, taking sharing into account, node T1 only obtains half of the real link capacity $C_{A1,C1}$ and $C_{A1,C2}$ if there are no link failures. As an example, the sharing is based on link capacity instead of traffic when considering traffic oblivious load balancing. If the sharing of link capacity is ignored, then lower level 1 nodes (e.g., nodes T1 and T2) will overestimate the upstream link capacities on level 2 nodes (e.g., nodes A1 and A2) when link failures occur.

After the sharing of link capacity is considered, the link capacity that qualifies for minimum cut calculation in a subgraph is defined as the effective link capacity for the sending node in the subgraph. As an example, in a fat-tree topology, the sharing may be considered at level 2 nodes (e.g., nodes A1 and A2) in a sender pod.

For each link shown in FIG. 4, x/y is used to denote the case in which x is the effective link capacity and y is the real collected (e.g., current) link capacity. For simplicity, a link is marked by a single value if its effective link capacity and its current real link capacity are equal. To simplify the illustration, only the link capacities in the sender pod 106 for node T1 are shown, as all the other healthy links to any receiver pod may be omitted by the min procedure in equation 2.

FIG. 4(A) illustrates a subgraph for a pod of a fat-tree network without link failures, with full link capacity normalized as 1. Node T1 is illustrated in FIG. 4 as having two upstream interfaces, namely $IF_1$ to node A1 and $IF_2$ to node A2. As an example, the upstream link capacity of A1 may be shared by links (T1, A1) and (T2, A1) equally. Thus, the effective link capacity, from the perspective of node T1, is shown as 0.5 for the two upstream links from nodes A1 and A2. For node T1, the effective link capacities are used to calculate the minimum cuts traversing $IF_1$ and $IF_2$, and thus balance its upstream load as 1:1, as shown in FIG. 4(A). The "1:1" may be viewed as load-balancing weights of "1" for each interface $IF_1$ and $IF_2$, as well as a load balancing ratio of 1:1 for interfaces $IF_1$ and $IF_2$.

If an upstream link of node A1 fails, as shown by a link capacity of "0" in FIG. 4(B), the minimum cut of T1 traversing $IF_1$ facing the failure becomes 0.5, which results in an optimal load balance ratio of 0.5:1 (e.g., 1:2) at node T1, as shown in FIG. 4(B). Unfortunately, the effective link capacity is not a static value, as network conditions change over time. FIG. 4(C) illustrates an additional failed link (T2, A1) shown with a capacity of "0". If static effective link capacity is used, then T1 may continue to balance its upstream traffic as 0.5:1. On the contrary, the optimal load balance for T1 is now 1:1, as shown in FIG. 4(C), which takes the failed link (T2, A1) into account. As shown, the upstream capacity of node A1 is no longer shared by node T2. Thus, the effective link capacity on A1 is recalculated accordingly as 1:1.

Figure 5:
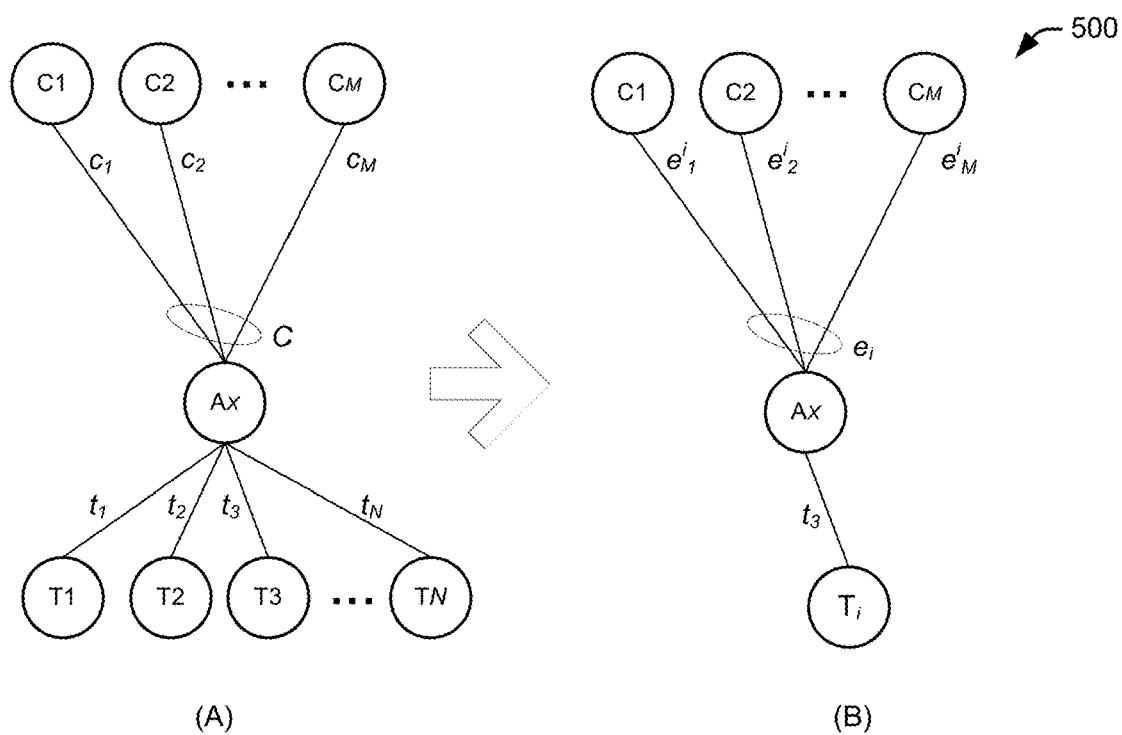
FIG. 5(A) illustrates current link capacities of links between nodes in an example network.
FIG. 5(B) illustrates effective link capacities of links between nodes in an example network.

FIG. 5 shows an example environment 500 to generalize the calculation of effective link capacities of upstream links at a node Ax from a perspective of a downstream node Ti. FIG. 5(A) illustrates a topology of nodes and links, with current link capacities $c_1$ to $c_M$ of upstream links of node Ax as collected. There are N nodes T1 to TN competing for M upstream links at Ax. The upstream links are illustrated as having real capacity $c_1$ to $c_M$, and the total upstream link capacity is denoted as C ($C = \Sigma_{j=1}^{M} c_j$). The N input links have current collected capacity $t_1$ to $t_N$.

FIG. 5(B) illustrates an example subgraph of effective link capacities for node Ti. There are M Core switches on the selected (least-cost) paths traversing switch Ax. The notation $e_j^i$ is used to denote the effective link capacity of j-th upstream link at node Ax for node Ti, and the total effective link capacity of Ti at Ax is denoted as $e_i$. There are N nodes T1 to TN competing for M upstream links at Ax.

FIG. 6 at 600 shows an example of pseudo code used to calculate effective link capacity. The pseudo code illustrates dividing the output (i.e., upstream) link capacities "fairly" among the input links, then the share of node Ti is its total effective link capacity $e_i$. Considering that the input links may partially fail, and the remaining link capacity should be utilized as much as possible, the upstream link capacities are divided to maximize the minimum share to nodes T1 to TN, instead of making them proportional to the input link capacities.

The following is a brief discussion of the example pseudo code illustrated in FIG. 6, in the context of FIGS. 5(A) and 5(B). Lines 1 to 4 provide for initialization of variables. As an example, in line 3, real collected upstream link capacities $c_1$ to $c_M$ for links between a node Ax and upstream nodes C1 to CM may be summed to determine the total upstream link capacity. At line 6, the fair share for the remaining input links is calculated, and distributed to an input link in line 11. The allocated upstream link capacity may be recorded in line 10. The loop will stop either when no input link has capacity (line 7) or all upstream link capacity has been allocated (line 14). Lines 15 and 16 enforce a residual capacity allocation. Line 17 illustrates calculation of the effective upstream link capacities are calculated for node Ti. As an example, all level 2 nodes can similarly use the algorithm to calculate the effective link capacities for their connected sender level 1 nodes.

FIG. 7 shows an example environment 700 for a sender/receiver node pair in a fat-tree topology. Example FIGS. 7(A) and 7(B) illustrate two subgraphs for the shortest paths from node T1 to node T3 traversing corresponding upstream nodes. FIG. 7(A) illustrates a partially failed link (C1, A3) that has lost half of its capacity. Thus, link (C1, A3) has a remaining capacity of 0.5. As an example, node T1 is a sender node that will perform load balancing to receiver node T3.

As shown in FIG. 7(A), the minimum link capacity crossing node C1 is min($C_{A1,C1}$, $C_{C1,A3}$)=0.5, and the minimum link capacity crossing node C2 is min($C_{A1,C2}$, $C_{C2,A3}$)=1.0. For sender node T1, 0.5 and 1 (e.g., C=1.5) is used as the output link capacity to calculate the effective link capacity through node A1. Node A1 has another input link from node T2 (not shown), so the effective uplink capacity of T1 is half of the real link capacity (e.g. (0.5+1)/2=0.75). With the algorithm shown in FIG. 6, the effective link capacity of the partially failed link set (A1, C1) and (C1, A3) is thus 0.5*0.5=0.25. Using equation 2 to calculate the minimum cut of the subgraph in FIG. 7(A) yields the min(1, 0.25+0.5, 1)=0.75. Similarly, the minimum cut of the subgraph in FIG. 7(B) yields a maximum flow equal to 1. This is determined by using equation 2, or noting that the upstream link capacity seen by node A2 is equal to 2, which may be divided by 2 to take into account capacity usage by both nodes T1 and T2. Therefore, in various embodiments, node T1 calculates the maximum flow for the two subgraphs in FIGS. 7(A) and 7(B) as 0.75 and 1, respectively. Thus, the balanced traffic load ratio for the two upstream interfaces at node T1 using effective link capacities is 0.75:1=3:4. From the perspective of node T1, this ratio, or these corresponding weights, are used to load-balance traffic load to level 2 nodes A1 and A2.

As an example, nodes are configured with a distributed algorithm using existing protocols, such as distance-vector routing protocols, where an average link failure ratio to a destination node can be calculated for parallel links in a cut of least-cost paths, with a maximal failure ratio used for concatenated links. The distributed algorithm can be configured to aggregate and propagate ratios of capacity in the presence of link failure(s) to adjust load balancing weights (e.g., ratios).

Complexity Reduction

The techniques described herein can be used to determine minimum cuts for all sender/receiver node pairs in a network. The "min" procedure described above in equation 2 indicates that the minimum cut determines the maximum flow in a subgraph. An evaluation of equation 2 indicates that the cut values of healthy links (e.g., fully operational links) can be omitted from minimum cut calculations.

Considering that the number of failed links and/or partially failed links in the network is still much lower than those healthy links, the minimum cut procedure can be greatly simplified. As an example, for each pod in the network, there are at least two types of pods: 1) healthy pods, where there are no link failures; and 2) unhealthy pods, where there are link failures. If there are failed (or partially failed links) inside a pod, or links connecting the pod to Core switches that are (partially) failed, then the pod is considered as an unhealthy pod. For example, in FIG. 1, if only link (T3, A4) is (partially) failed, then pod 108 is an unhealthy pod. Similarly, if only link (A3, C1) is (partially) failed, then pod 108 is also an unhealthy pod. Correspondingly, there are at least four cases for connectivity between node pairs:

1) Connectivity between healthy to healthy pods,
2) Connectivity between healthy to unhealthy pods,
3) Connectivity between unhealthy to healthy pods, and
4) Connectivity between unhealthy to unhealthy pods.

Complexity reduction of the minimum cut procedure, as well as the algorithm in FIG. 6, can be achieved by omitting calculations for pods for the first case above, as the paths between pods in case 1 are symmetric. Therefore, based on symmetry, the ratio of weights is the same for communications between all healthy pod pairs. For the second case, as the sender pod is a healthy pod with no link failures, the effective link capacity can be obtained by dividing the link capacity equally by associated level 1 nodes. Thus, the minimum cut is determined by evaluating the unhealthy pod, where the same determined load-balancing ratios are used for traffic from the unhealthy pod to the healthy pod, as for traffic from the healthy pod to the unhealthy pod. For the third case, the minimum cut calculation procedure is carried out as described herein with regard to FIG. 7. However, the minimum cut procedure only needs to be performed once, as the ratio of minimum cuts to all healthy pods is the same. Finally, for the fourth case, the minimum cut procedure is carried out per pod pair.

Consequently, the computation complexity to carry out the minimum cut procedure can be determined by the number of unhealthy pods in the network, instead of the number of failed links. Assuming there are $N_f$ unhealthy pods in a network, and each pod has $N_A$ level 2 nodes, then in a worst case, the algorithm in FIG. 6 may be carried out $(N_f + N_f(N_f-1))N_A = N^2_f * N_A$ times, given that $N_f > 1$.

In contrast to fat-tree topology, the minimum cut of a VL2 topology involves more links, and thus the computational complexity is generally greatly increased. Considering that a goal is not to obtain the absolute value of the minimum cuts, but to use the ratio of minimum cuts for load balancing, a scheme is described herein that simplifies the minimum cuts procedure.

Figure 8:
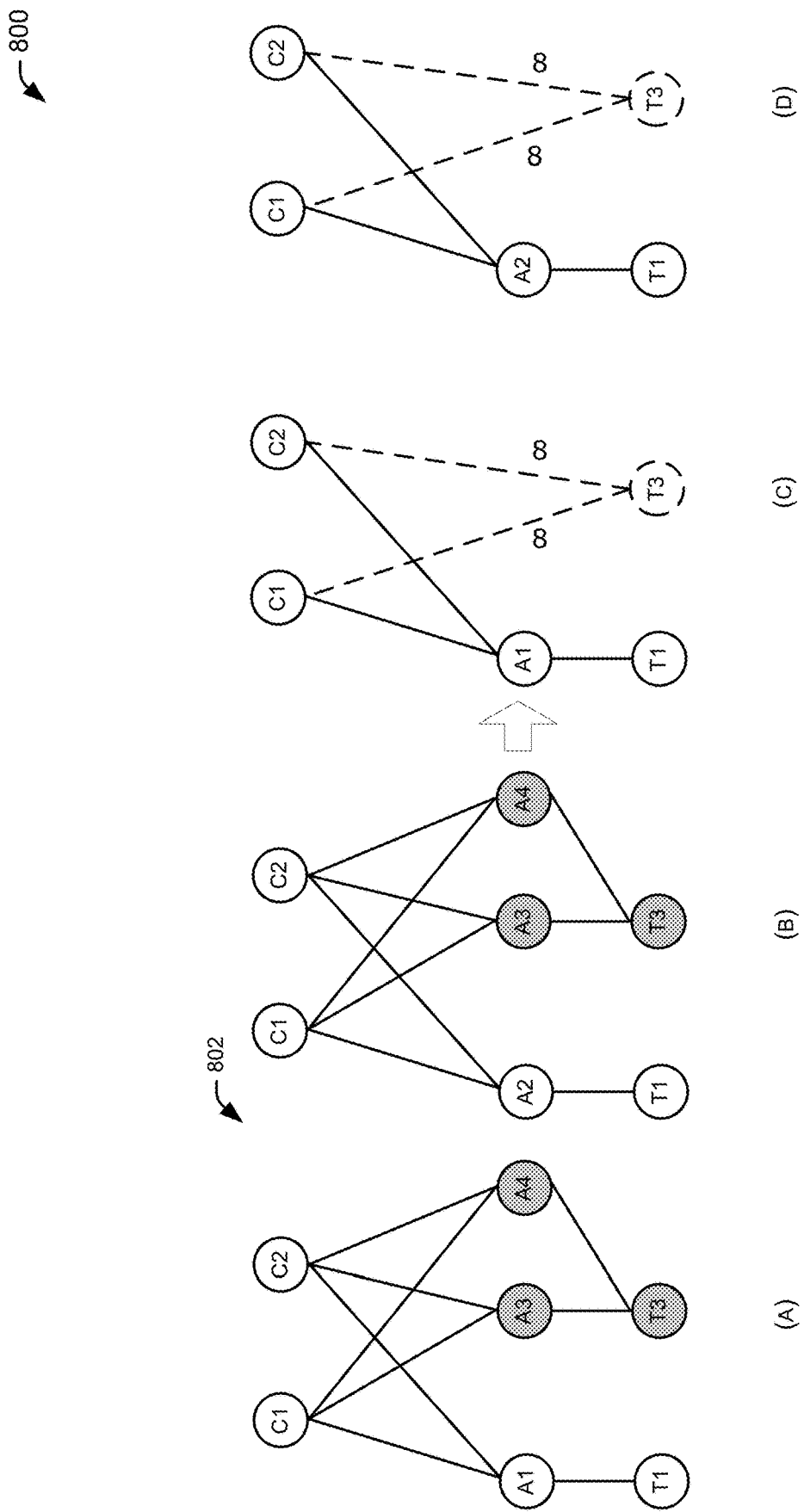
FIGS. 8(A)-8(D) illustrate common part reduction of subgraphs.

FIG. 8 shows an example of two subgraphs in FIGS. 8(A) and 8(B) for a VL2 topology 802 consistent with the VL2 topology 104 of FIG. 1. In FIG. 8, load balancing is considered for source node T1 providing traffic to destination node T3. As illustrated in FIGS. 8(A) and 8(B), node T1 has two interfaces for links to nodes A1 and A2, respectively. The subgraphs for the shortest-paths traversing the two interfaces are shown in FIGS. 8(A) and 8(B), respectively. For the effective subgraph shown in FIG. 8(A), at node A1, node T1 is competing with node T2, so node A1 performs the algorithm illustrated in FIG. 6. However, at nodes C1 and C2, node A1 is competing with node A2 (not shown), which requires using the algorithm illustrated in FIG. 6 again.

As shown in example environment 800 of FIG. 8, computational complexity is reduced by removing the common part of the subgraphs, shown as shaded nodes in FIGS. 8(A) and 8(B). As an example, the links for node A3, node A4 and destination node T3 appear in the two subgraphs in FIGS. 8(A) and 8(B). Therefore, these nodes can be removed and replaced with two virtual links to destination node T3, as shown in FIGS. 8(C) and 8(D). The two virtual links are represented as having infinite link capacity and are shown marked with dashed lines in FIGS. 8(C) and 8(D), representing two transformed subgraphs. The removal procedure implies that node T1 may ignore link failures, including partial link failures, on the removed part of the subgraphs to reduce complexity in the minimum cut calculation.

Thus, to reduce computational complexity of the minimum cuts calculation, healthy pods are differentiated from unhealthy pods, so that common parts of subgraphs can be determined and removed. The obtained maximum flows are then used as weights or ratios to balance loads on corresponding interfaces.

As an example, assume that an i-th ($1 \le i \le n$) converted subgraph has a maximum flow of $f_i$ and that n is a number of subgraphs under consideration. Without loss generality, assume that $f_i \le f_{i+1}$, for $1 \le i \le n-1$. For the common part of a subgraph that is to be removed, assume that the maximum flow is $f_c$. Therefore, the maximum flow for the corresponding original subgraph is calculated as $f_i' = \min(f_i, f_c)$. To check the link capacity constraints, the following cases are considered: 1) $f_n \le f_c$, then $f_i = f_i'$; and 2) $f_n > f_c$, and $f_c$ is the maximal achievable total capacity. Thus, $\forall j$, the share may be determined as $$\frac{f_i}{\sum_{i=1}^{n} f_i} f_c \le \frac{f_j}{f_n} f_c < f_j.$$

Thus, the final balanced bandwidths using the ratio of converted subgraphs do not violate the link capacity constraints. Consequently, for a given node in the capacity graph of a fat-tree or a VL2 topology, the techniques described herein balances traffic load to a destination node.

As an example, for each interface on the given sender node, a subgraph can be constructed for all of the selected paths traversing the interface to a destination node. Next, the common part of the subgraphs is removed to calculate the minimum cuts. Then, for each interface, the load is balanced using the ratio of corresponding minimum cuts by adjusting the number of ECMP entries for that interface.

Example Implementations

The load balancing techniques described herein can be performed in a centralized fashion by a centralized controller (e.g., one or more servers), in a distributed fashion by nodes in a DCN, and/or combinations thereof. In various embodiments, a centralized controller determines a topology of the DCN, collects link capacity information from nodes, receives link failure information from nodes, determines optimal weights (e.g., number of ECMP entries for interfaces, ratios for interfaces, etc.) to split traffic for load balancing and provides weights to associated nodes to use to enforce load balancing on their interfaces. As an example, the centralized controller determines weights for optimal load balancing in nodes using a global view based algorithm designed for integration with a link-state routing protocol. Thus, the global view based algorithm is used to calculate the maximum flows (e g, minimum cuts) for converted subgraphs using effective link capacities that take into account link sharing by multiple nodes in view of link failures that could include partial link failures.

The centralized controller can reduce computational complexity by determining healthy and unhealthy pods, and/or by removing common parts of subgraphs. The maximum flows are used as weights to balance loads on corresponding interfaces of nodes. Out-of-band or in-band communications channels can be used for nodes to communicate topology, capacity, configuration and/or link status information (e.g., link failure and link recovery information) to the centralized controller, and for nodes to receive corresponding load-balancing weights and/or ratios. Nodes are not required to maintain a persistent connection status with the controller, such that nodes simply communicate with the controller when they detect link capacity changes. As an example, by splitting traffic to a destination node on multiple network interfaces of a source node, a global view based algorithm achieves optimal load-balancing while maximizing usage of available link capacity. Through each interface, the maximum flow traversing the least-costs paths represents the maximal load a node can achieve on the interface, which works for load balancing with partial LAG failures.

In various embodiments, the load balancing techniques described herein can be integrated into nodes, such that the centralized controller is not required. The nodes may include commodity switches and/or routers of a DCN. As an example, the load balancing techniques described herein are distributed across nodes and integrated with routing and/or load balancing protocols in the nodes, to include ECMP and/or other protocols or algorithms. As an example, the nodes collect topology information, link status information, link capacity information and link failure information to perform the load balancing techniques described herein to determine and enforce weights for load-balancing on interfaces. Additionally, the nodes can be configured to maintain a global view of the topology of nodes and links in the DCN. Thus, the load-balancing techniques described herein can operate as a distributed algorithm among nodes that propagate and aggregate ratios of link capacities to adjust load balancing weights to compensate for link failures. As an example, the load-balancing techniques described herein can be integrated into existing distance-vector routing protocols used by commodity switches and routers.

In another embodiment, load balancing is shared among nodes and a central controller, where nodes and a controller each perform a portion of the load balancing techniques described herein. As an example, a controller maintains a global view of the topology of nodes and links, link capacity information and/or collects link status information, and provides information to nodes as needed, such that various nodes calculate their own weights to dynamically achieve load balancing. As another example, nodes maintain local topology, link capacity and link status information, and use the central controller for distant (e.g., multiple hops away) or global information regarding link or node status.

As an example, existing commodity switches commonly support ECMP by using multiple routing entries for interfaces, which indicate the corresponding next hop addresses. Therefore, to achieve a weighted version of ECMP, a number of multiple routing entries are provided for each interface, and the numbers of the entries are proportional to the weights used for load balancing.

As an example, enhanced load-balancing is used to: calculate effective link capacities for links of paths between a sending node and a receiving node in a network, the effective link capacities accounting for a sharing of current link capacities of the links by one or more other nodes of the network; determine maximum flows for the paths based at least in part on the effective link capacities; and determine weights based at least in part on the maximum flows for interfaces of the sending node for load balancing traffic over the paths.

As an example, the network is configured in a multi-rooted tree topology, where the paths are shortest paths, the sending node is in a first pod of the multi-rooted tree topology and the receiving node is in a second pod of the multi-rooted tree topology. The first pod may be determined to have one or more link failures and the second pod may be determined to have no link failures, where the weights are used by the sending node to load balance traffic over paths to other destination nodes in other pods that have no link failures. The paths can be represented as subgraphs, where common parts of the subgraphs can be determined, converted subgraphs can be created by removing the common parts of the subgraphs and the maximum flows can be determined by calculating minimum cuts of the converted subgraphs.

Example Load-Balancing System

Figure 9:
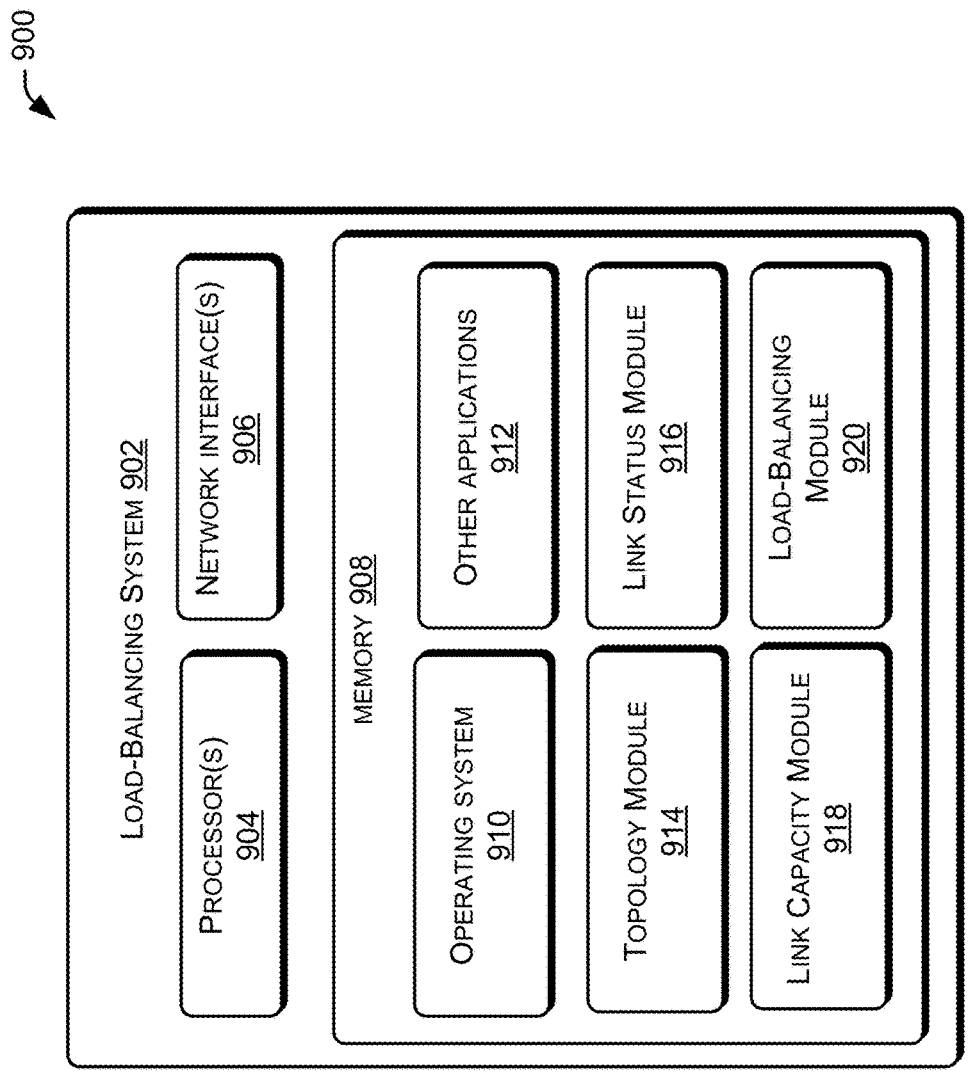
FIG. 9 is a block diagram that illustrates components of example load-balancing systems.

FIG. 9 illustrates an example environment 900 of a load balancing system 902. As discussed above, load balancing system 902 can be implemented by a central controller, nodes, or combinations thereof. As such, components of load-balancing system 902 will be described in the context of a central controller as well as network nodes, such as commodity network switches and routers (e.g., commercial off-the-shelf non-custom, non specialized switches and routers) that do not require a central controller.

As shown in FIG. 9, load-balancing system 902 includes one or more processors 904, one or more network interfaces 906 for interfacing with nodes of the DCN and memory 908. Network interfaces 906 can provide for out-of-band and/or in-band communications between nodes and/or communications between nodes and a central controller. Memory 908 stores instructions executable by processors 904 that include an operating system(s) 910 (e.g., operating system of a controller and/or network node), other applications 912 (e.g., other server applications of a controller, routing and load-balancing protocols of a node), topology module 914, link status module 916, link capacity module 918 and load balancing module 920. For embodiments of the load balancing system 902 that incorporate a central controller, processors 904, network interfaces 906 and memory 908 include processors, network interfaces and memory, respectively, of the central controller and nodes in the network.

Topology module 914 can be configured to determine a topology of nodes, links and an interconnection structure of nodes and links in a network, such as a DCN. In various embodiments, the topology may include a global topology of all nodes and all links of the network. In various other embodiments, the topology may include a local topology of links and nodes in the network. As an example, a node uses topology module 914 to determine a local or a global topology of nodes and links in the network suitable for implementing the load-balancing techniques as described herein. A central controller uses topology module 914 to determine a global topology of nodes and links. Topology module 914 can be configured to determine healthy and unhealthy pods, as well as common parts of subgraphs, to reduce complexity of maximum flow calculations, as described herein. As an example, topology module 914 determines a pod in the network associated with a link having a partial link failure, and determines other pods in the network that are not associated with link failures, to reduce complexity of maximum flow calculations.

Link status module 916 is configured to determine, receive and/or report a status of links of nodes in the network. In an embodiment where a central controller is used, a link status module 916 in the central controller can be used to receive, store and process link status information received from nodes (e.g., link failures, partial link failures), while a link status module 916 in a node can be used to determine and report a link status of links to the central controller. In an embodiment where a central controller is not used, link status module 916 is used by nodes to determine global or local link status of links in the network, and detect link failures and partial link failures when they occur.

Link capacity module 918 can be configured in a central controller and/or nodes to determine current real link capacity information on local or global links in the network. In various embodiments where a central controller is used, a link capacity module 918 in a central controller can be configured to receive, and acknowledge receipt of, link capacity information provided by nodes, while link capacity module 918 in a node can be configured to determine link capacities of links and provide link capacity information to the central controller. In various embodiments where a central controller is not used, link capacity module 918 in a node can be configured to determine local or global link capacities of links and provide link capacity information to other nodes.

Load-balancing module 920 can be configured in a central controller and/or nodes to determine effective link capacities and calculate load balancing weights or load balancing ratios (e.g., numbers of ECMP table entries for interfaces) to implement load-balancing techniques as described herein. In various embodiments where a central controller is used, a load-balancing module 920 in the central controller can be configured to calculate load balancing weights or load balancing ratios and provide load-balancing weights and/or ratios to nodes in the network to use for load balancing. In various embodiments where either a central controller is used or not used, load-balancing module 920 in nodes in the network can be configured to calculate load balancing weights or load balancing ratios to use for load-balancing.

As an example, load-balancing module 920 determines effective link capacities for links of paths between a sending node in a pod and a receiving node in one of the other pods, the effective link capacities accounting for a detected partial link failure and a sharing of current link capacities of the links by one or more other nodes in the network; determines maximum flows for the paths based at least in part on the effective link capacities; determines weights based at least in part on the maximum flows for the sending node for load balancing traffic over the paths; and uses the weights for load balancing traffic from the sending node to other destination nodes in the other pods. Thus, load-balancing module 920 uses information regarding healthy pods and unhealthy pods to reduce complexity of maximum flow calculations, as described herein. Moreover, load-balancing module 920 balances traffic by using a remaining capacity of one or more links that have partial link failure. Load-balancing module 920 can be executed by one or more processors in nodes, such as sending nodes.

The memory 908 is an example of computer-readable media. As used herein, the term computer-readable media includes at least two types of computer-readable media, namely computer-readable storage media and communications media.

Computer-readable storage media includes volatile and non-volatile, removable and non-removable media implemented in any method or technology for storage of information such as computer readable instructions, data structures, program modules, or other data. Computer-readable storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

Example Methods of Operation

Figure 10:
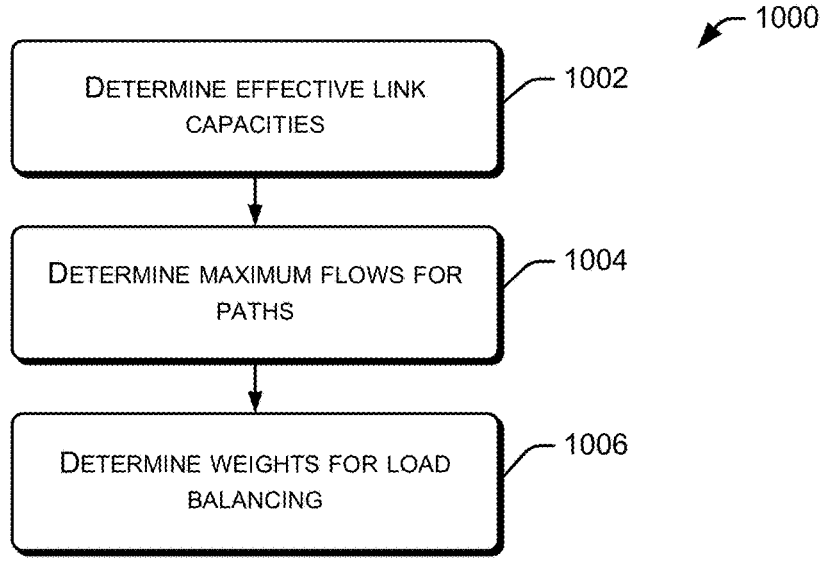
FIG. 10 is a flowchart showing an example load-balancing process.
Figure 11:
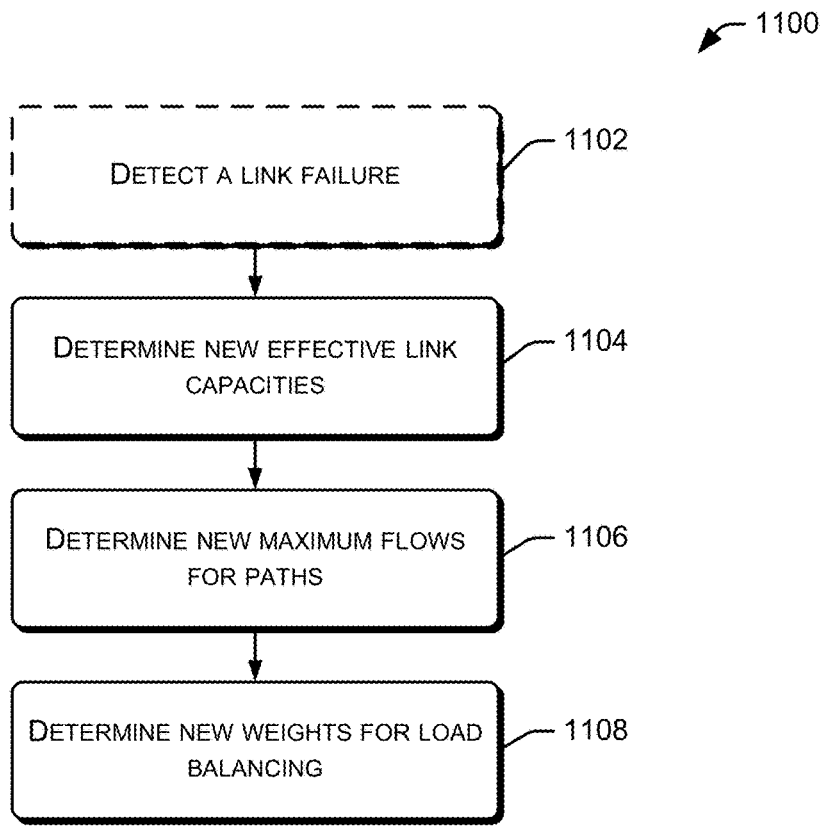
FIG. 11 is a flowchart showing an example load-balancing process upon detection of a failure condition.

FIG. 10 and FIG. 11 present example methods 1000 and 1100, which are illustrated as collections of blocks in logical flow graphs representing sequences of operations that can be implemented in hardware, software, firmware, or a combination thereof. The order in which the methods are described is not intended to be construed as a limitation, and any number of the described method blocks can be combined in any order to implement the method, or alternate methods. Additionally, individual blocks may be omitted from the methods without departing from the spirit and scope of the subject matter described herein. In the context of software, the blocks represent computer instructions that, when executed by one or more processors, perform the recited operations.

FIG. 10 is a flowchart showing an illustrative method 1000 of enhanced load balancing in a network configured in a multi-rooted tree topology, such as illustrated in FIG. 1.

At 1002, load-balancing module 920 determines effective link capacities that account for sharing of current link capacities by one or more other nodes of the network for links of paths between a sending node and a receiving node in a network. The current link capacities determined by link capacity module 918 may include one or more links with partial or complete link failure, and/or links with no link failures. As an example, referring to topology 102 or 104 of FIG. 1, assume node T1 is a sending node and node T3 is a receiving node. One or more of nodes T1 and T3, as well as traversed nodes A1-A4, C1 and C2 can include commodity network switches. Node T2 shares capacity, such as upstream capacity, of links from the perspective of sending node T1. As exemplified in FIG. 1, the network can be configured in a multi-rooted tree topology.

At 1004, load-balancing module 920 determines maximum flows for the paths based at least in part on the effective link capacities. As an example, as illustrated in FIGS. 3 and 7, shortest paths between nodes T1 and T3 are represented as subgraphs, where the maximum flows are determined for paths by finding or calculating minimum cuts in the subgraphs.

At 1006, load-balancing module 920 determines weights. As an example, weights are based at least in part on the maximum flows for load balancing traffic over the paths by the sending node. FIG. 7 illustrates determining maximum flows of 0.75 and 1, as a ratio of 0.75:1, for two shortest paths between node T1 and node T3. As an example, the ratio of 0.75:1 is represented as the ratio of 3:4, with weights 3 and 4 used to determine a number of entries of node T1 interfaces entered in an ECMP table to facilitate load balancing of node T1. In a case where node T1 uses interface $S_1$ and $S_2$ to connect via links to nodes A1 and A2, respectively, the weights used to populate an ECMP table for node T1 as: $S_1, S_1, S_1, S_2, S_2, S_2, S_2$, thus achieving the 3:4 ratio.

FIG. 11 is a flowchart showing an illustrative method 1100 of enhanced load balancing, optionally initiated upon failure detection, in a network configured in a multi-rooted tree topology, such as illustrated in FIG. 1.

At 1102, link status module 916 detects a link failure of a link of one of the paths. The link failure may include a partial link failure, such as a partial failure of a LAG. The link failure may include a total link failure as well as multiple link failures. As an example, FIG. 7(A) illustrates a partial link failure of a link between nodes C1 and A3 on a path between nodes T1 and T3. FIG. 2 illustrates multiple partial link failures. At 1104, load-balancing module 920 determines new effective link capacities associated with the partial link failure. At 1106, load-balancing module 920 determines new maximum flows for the paths. As an example, the new maximum flows are based at least in part on the new effective link capacities. At 1108, load-balancing module 920 determines new weights for the sending node based at least in part on the new maximum flows. The new weights are used, for example by load-balancing module 920, to load balance traffic over the paths to compensate for failure conditions. In contrast to disabling a partially failed LAG, as well as disabling additional healthy LAGs, as is commonly done to accommodate currently used routing and load-balancing protocols, the new weights load balance traffic to utilize a remaining capacity of the link having the detected partial link failure. As illustrated in FIG. 7(A), even though the link between nodes C1 and A3 has lost 50% of its current capacity, the remaining 50% of the link's capacity is utilized in the enhanced load-balancing techniques described herein.

In various embodiments, the enhanced load-balancing techniques described herein may be implemented solely by nodes in the network by using a distributed algorithm that propagates and aggregates ratios of link capacities, such as upstream link capacities on paths, to adjust load balancing weights in response to link failures as well as partial link failures. Thus, as an example, the method of enhanced load-balancing may be performed by a sending node, such as node T1 as illustrated in FIG. 3.

In other various embodiments, the method of enhanced load-balancing is performed at least in part by a centralized controller, such as a centralized controller used in Software Defined Networking (SDN), or the like. As an example, the centralized controller provides the weights to the sending node, as well as other nodes in the network, to perform the load balancing of the traffic over the paths. The centralized controller implements the enhanced load-balancing techniques described herein as a global view based algorithm designed for link-state routing protocols that calculates maximum flows for converted subgraphs using effective link capacities, and reduces the complexity by cutting common part of those subgraphs. The maximum flows are used as weights to balance load on corresponding interfaces of nodes

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, technologies and/or techniques described herein are applicable to other types of network topologies, such as network topologies that differ from the topologies illustrated in FIG. 1.

We claim:

1. A method comprising:
   under control of one or more processors configured with executable instructions:
   determining, for logical links of two or more paths between a sending node and a receiving node, effective link capacities that account for sharing of link capacities associated with one or more upstream links at a node from a perspective of a downstream node, the logical links including multiple physical links, the effective link capacities accounting for partial failure of a logical link of the logical links, the partial failure including a failure of a physical link of the physical links;
   wherein determining the effective link capacities includes:
      determining minimum link capacities for each upstream node in the two or more paths based on all nodes in the two or more paths directly upstream from the upstream node; and
      determining the effective link capacities based on the minimum of the determined minimum link capacities;
   determining minimum cuts on the two or more paths based on the determined effective link capacities;
   determining maximum flows for the two or more paths based at least n part on the determined effective link capacities and the determined minimum cuts; and
   determining weights based at least in part on the maximum flows for load balancing traffic over the two or more paths by the sending node.

2. The method of claim 1, wherein at least one of the sending node, the receiving node or one or more other nodes include a commodity network switch.

3. The method of claim 1, wherein the network is configured as a multi-rooted tree topology.

4. The method of claim 1, wherein:
the two or more paths are represented as subgraphs;
determining the minimum link capacities includes determining the minimum of all link capacities to the upstream node in a subgraph of the subgraphs; and
determining the effective link capacities includes determining the minimum of each sum of minimum link capacities on a path of the paths between the sender node and the receiver node.

5. The method of claim 1, further comprising:
detecting a partial link failure of a link of at least one of the two or more paths;
determining new effective link capacities associated with the partial link failure;
determining new maximum flows for the two or more paths based at least in part on the new effective link capacities; and
determining new weights for the sending node based at least in part on the new maximum flows to load balance traffic over the two or more paths.

6. The method of claim 5, wherein the new weights load balance traffic to utilize a remaining capacity of the link having the detected partial link failure.

7. The method of claim 1, wherein the method is performed by the sending node.

8. The method of claim 1, wherein the method is performed at least in part by a centralized controller.

9. The method of claim 1, wherein the sharing of current link capacities for the links is by one or more other nodes of the network.

10. One or more non-transitory computer-readable storage media storing computer-executable instructions that, upon execution by one or more processors, configure the one or more processors to implement claim 1.

11. The method of claim 1, wherein the centralized controller provides the weights to the sending node to perform the load balancing of the traffic over the two or more paths.

12. A system comprising:
one or more processors;
one or more non-transitory computer-readable storage media having computer-executable instructions thereon that, upon execution by the one or more processors, configure the one or more processors to perform acts comprising:
calculating, for logical links of two or more paths between a sending node and a receiving node in a network, effective link capacities, the effective link capacities accounting for a sharing of link capacities associated with one or more upstream links at a node from a perspective of a downstream node, the logical links including multiple physical links, the effective link capacities accounting for partial failure of a logical link of the logical links, the partial failure including a failure of a physical link of the physical links;
wherein determining the effective link capacities includes:
determining minimum link capacities for each upstream node in the two or more paths based on all nodes in the two or more paths directly upstream from the upstream node; and
determining the effective link capacities based on the minimum of the determined minimum link capacities;
determining minimum cuts on the two or more paths based on the determined effective link capacities;
determining maximum flows for the two or more paths based at least in part on the effective link capacities and the determined minimum cuts; and
determining weights based at least in part on the maximum flows for interfaces of the sending node for load balancing traffic over the two or more paths.

13. The system of claim 12, wherein:
the network is configured in a multi-rooted tree topology;
the two or more paths include shortest paths;
the sending node is in a first pod of the multi-rooted tree topology; and
the receiving node is in a second pod of the multi-rooted tree topology.

14. The system of claim 13, wherein:
the first pod has one or more link failures;
the second pod has no link failures; and
the weights are used by the sending node to load balance traffic over paths to other destination nodes in other pods that have no link failures.

15. The system of claim 12, the acts further comprising:
representing the two or more paths as subgraphs;
determining common parts of the subgraphs;
creating converted subgraphs by removing the common parts of the subgraphs; and
determining the maximum flows, in part, by calculating the minimum cuts of the converted subgraphs.

16. The system of claim 12, wherein the acts are performed by the sending node or at least in part by a central controller.

17. A system comprising:
non-transitory computer-readable media;
one or more processors communicatively coupled to the non-transitory computer-read media;
modules stored on the non-transitory computer-readable media and executable by the one or more processors to configure the system, the modules comprising:
a link status module to detect a partial link failure of a link in a network of nodes configured as a multi-rooted tree topology;
a topology module to:
determine a pod in the network associated with the link having the partial link failure; and
determine other pods in the network that are not associated with link failures;
a load balancing module to:
determine, for logical links of two or more paths between a sending node in the pod and a receiving node in one of the other pods, effective link capacities, the effective link capacities accounting for the partial link failure and a sharing of link capacities associated with one or more upstream links at a node from a perspective of a downstream node, the logical links including multiple physical links, the effective link capacities accounting for partial failure of a logical link of the logical links, the partial failure including a failure of a physical link of the physical links;
wherein determining the effective link capacities includes:
determining minimum link capacities for each upstream node in the two or more paths based on all nodes in the two or more paths directly upstream from the upstream node; and
determining the effective link capacities based on the minimum of the determined minimum link capacities;
determining minimum cuts on the two or more paths based on the determined effective link capacities;

determine maximum flows for the two or more paths based at least in part on the effective link capacities and the determined minimum cuts;

determine weights based at least in part on the maximum flows for the sending node for load balancing traffic over the two or more paths; and use the weights for load balancing traffic from the sending node to other destination nodes in the other pods.

18. The system of claim 17, wherein the load balancing balances traffic on a remaining capacity of the link having the partial link failure.

19. The system of claim 17, wherein the load balancing module is executed by one or more processors in the sending node.

* * * * *